United States Patent [19]
Levine et al.

[11] 3,808,531
[45] Apr. 30, 1974

[54] SERVOED METER MOVEMENT INCLUDING MONITORING CAPABILITIES

[75] Inventors: Alfred L. Levine, Waldwick; Walter Parfomak, Wallington, both of N.J.

[73] Assignee: The Bendix Corporation, Teterboro, N.J.

[22] Filed: Dec. 18, 1972

[21] Appl. No.: 316,201

[52] U.S. Cl. ............................... 324/157, 324/99 R
[51] Int. Cl. ........................................... G01r 17/06
[58] Field of Search .......... 324/157, 99 R, 125, 132, 324/100; 318/616

[56] References Cited
UNITED STATES PATENTS
3,704,415  11/1972  Yamanaka et al. ............... 324/99 R

*Primary Examiner*—Alfred E. Smith
*Attorney, Agent, or Firm*—Anthony F. Cuoco; S. H. Hartz

[57] ABSTRACT

A closed loop meter movement wherein the meter pointer is directly coupled to the shaft of a feedback signal generator and circuitry is provided for applying the feedback signal to the meter movement to satisfy requirements of smooth operation and low power consumption. A monitor is provided for monitoring pointer position with respect to a command signal.

4 Claims, 1 Drawing Figure

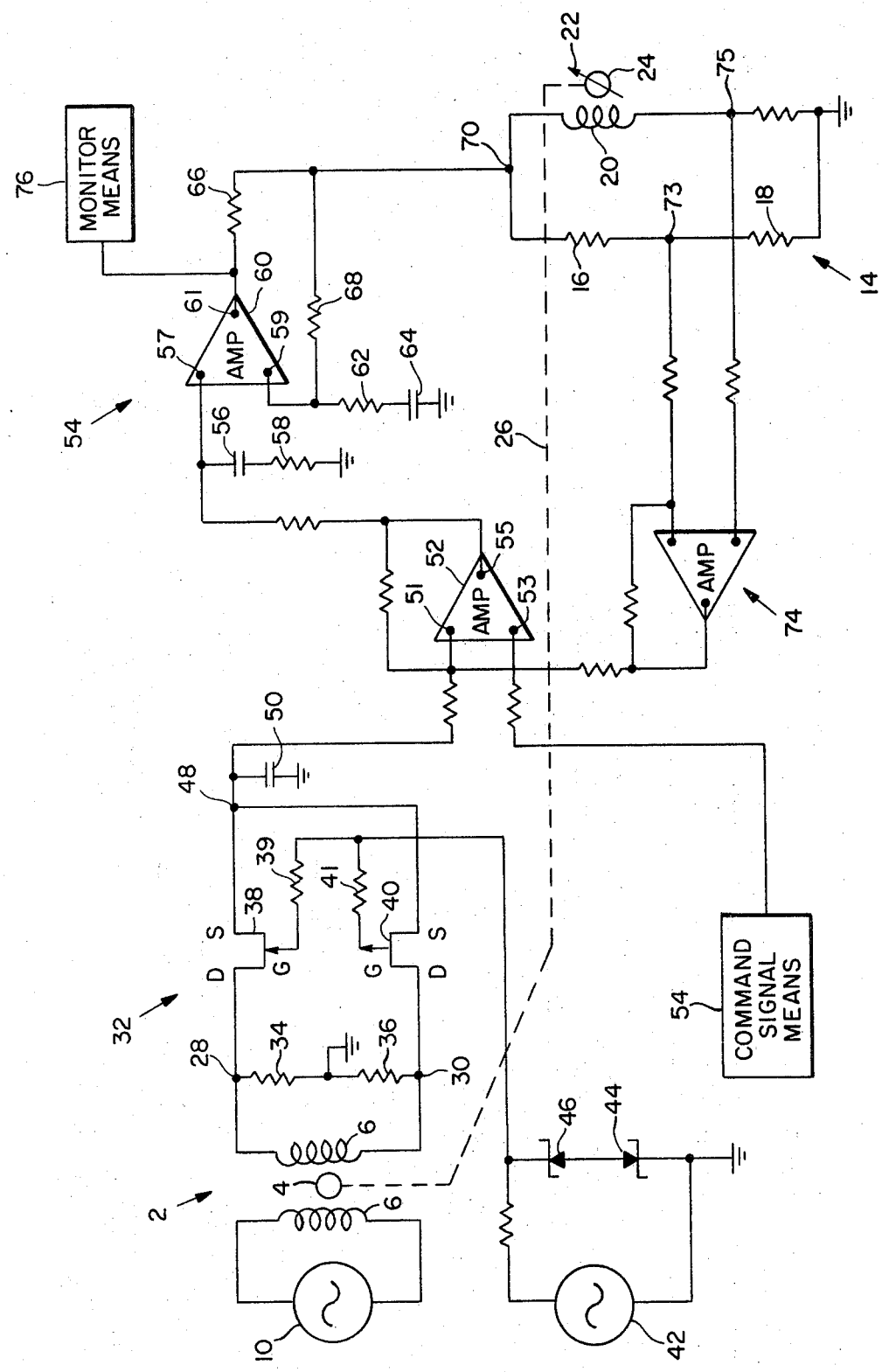

SERVOED METER MOVEMENT INCLUDING MONITORING CAPABILITIES

BACKGROUND OF THE INVENTION

1. Field of the Invention

This invention relates to meter apparatus such as used in aircraft attitude-direction indicators and the like. More particularly, this invention relates to a closed loop meter movement which features smooth operation, low power consumption and meter pointer position monitoring, as well as providing increased accuracy and long term stability.

2. Description of the Prior Art

Prior to the present invention meter movements for the purposes described have been of the open loop, low torque D'Arsonval type wherein pointer deflection is proportional to, or a function of, an input signal. No provision is made for assuring that the pointer is properly positioned and because of the inherent low torque and power outputs, devices of this type are extremely vulnerable to hang-ups. It has been known, for example, that the minutest particle of dirt, dust or other contamination, or even static charges on the meter or instrument cover glass, can cause erroneous and undetected results.

In order to overcome the aforenoted problems, pointer displays have been designed with typical servo mechanisms and torquer-pots. Devices of this type have the advantages of a closed loop system but lead to increased power consumption and do not provide the smooth operation which is required in the aforenoted indicator devices.

SUMMARY OF THE INVENTION

This invention contemplates a servoed meter movement wherein the shaft or rotor of a feedback signal generator is directly coupled to the meter pointer. The signal generator provides an alternating voltage proportional to its shaft position which, after demodulation, is summed with a d.c. command signal. The summed signal is applied to a lag-lead network which provides a drive signal for driving the meter pointer to a position that causes the signal from the signal generator to equal the command signal. A rate signal is derived from the meter drive signal and meter back EMF, and is summed with the command and demodulated signals for stability purposes. Monitoring is accomplished by sensing the meter pointer drive signal. If this signal is such that the meter pointer is at an incorrect position, a warning device is actuated.

One object of this invention is to provide a servoed or closed loop meter movement for use in aircraft attitude-direction indicators and the like where there is a requirement for smooth operation, low power consumption and meter pointer position monitoring.

Another object of this invention is to accomplish the above by directly coupling the meter pointer movement to the shaft of a suitably sensitive feedback signal generator.

Another object of this invention is to provide a meter movement of the type described wherein accuracy is a function of the feedback signal generator and is exclusive of the open loop characteristics of the meter itself.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes and is not to be construed as defining the limits of the invention.

DESCRIPTION OF THE DRAWING

The single FIGURE in the drawing is an electrical schematic diagram of the meter movement according to the invention.

DESCRIPTION OF THE INVENTION

A signal generator 2 including a shaft or rotor 4 and a stator having a pair of windings 6 and 8 is energized by a signal from a source of alternating voltage 10.

A meter 14 includes an input circuit having resistors 16 and 18 and a coil 20. A pointer 22 is carried on a shaft or rotor 24 inductively coupled to coil 20. The arrangement of coil 20, pointer 22 and shaft 24 will be recognized as the conventional D'Arsonval type meter movement.

Shaft 24 of meter 14 is directly coupled to shaft 12 of signal generator 2 through suitable mechanical means 26. Actually, in the preferred embodiment of the invention, the signal generator shaft and the meter shaft are one and the same. Shaft 24 of meter 14 is driven through the indicated circuitry as will be hereinafter described to provide a closed loop system as shown in the FIGURE.

For purposes of illustration, signal generator 2 may be of the type marketed by the Bendix Corporation under the trade designation *Microsyn*. A signal generator of this type is brushless, miniature and light in weight, and provides a highly accurate electrical signal output. The device is described in publication No. 623-1, published by the Navigation & Control Division of the Bendix Corporation, Teterboro, New Jersey.

The output from signal generator 2 at output terminals 28 and 30, and which output is proportional to the displacement of shaft 12 and is actually a feedback signal, is applied to a full wave demodulator 32. Demodulator 32 which provides a demodulated feedback signal may be of the conventional type or of the type shown in the FIGURE including serially connected voltage dividing resistors 34 and 36 and field effect transistors 38 and 40 connected at their drain elements (D) to input terminals 28 and 30, respectively. Transistors 38 and 40 are energized by a signal from a source of alternating voltage 42 applied to gate elements (G) of the transistors through a voltage limiting circuit including zener diodes 44 and 46 and through resistors 39 and 41, respectively.

The outputs from transistors 38 and 40 at source elements (S) of the transistors are combined at a point 48 and the combined signal is applied through a coupling capacitor 50 to an input terminal 51 of a differential summing amplifier 52. An externally derived command signal which may correspond, for example, to a flight condition is provided by a command signal means 54 and is applied to an input terminal 53 of differential summing amplifier 52. The output from amplifier 52 at an output terminal 55 corresponds to the difference between the command signal and the demodulated feedback signal from signal source 2.

The difference signal is applied through a lag-lead network 54 which may be of the conventional type or of the type shown in the FIGURE including a capacitor 56 and a grounded resistor 58 serially connected to an input terminal 57 of an amplifier 60, and a resistor 62 and a grounded capacitor 64 serially connected to another input terminal 59 of the amplifier. An output terminal 61 of amplifier 60 is connected to input terminal 59 through feedback resistors 66 and 68. Output terminal 61 of lag-lead circuit 54 is connected to meter 14 at a point 70 and provides a signal for driving meter shaft 24 to a position which causes the output of signal generator 2 at terminals 28 and 30 to be equal to the command signal from command signal means 54.

For stability purposes a rate signal is derived from the meter drive signal and from the meter back EMF by a preamplifier circuit 74 connected to meter 14 at points 73 and 75. The output from amplifier 74 is applied to input terminal 51 of amplifier 52 and summed thereat with the signal from capacitor 50.

Monitoring is accomplished by sensing the output of circuit 54 which, as heretofore noted, is the drive output for meter 14. If meter pointer 22 is at the correct position, this output is at null and if the output is at some predetermined threshold value, wherein the position of meter shaft 24 does not correspond to the input command signal, monitor means 76, which may include a relay for sounding an alarm or providing a visual indication, is actuated.

It will now be seen that the aforenoted objects of the invention have been met. Generally, the device has the advantages of low power and smooth operation and incorporates meter pointer position monitoring means. The accuracy of the system is a function of the signal generator and does not depend upon the open loop accuracy of the meter as do prior art devices. Additionally, stability is not dependent on meter characteristics such as magnetic properties and spring constants. Resistance to vibration and shock accomplished through the feedback arrangement whereby small deviations due to acceleration, etc., provide full restoring torque allows the device of the invention to operate at higher level environments than has heretofore been the case.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. For use with a meter of the type having a pointer carried on a shaft and an input circuit including inductive means arranged for displacing the shaft, the improvement comprising:
    a signal generator including a rotor coupled to the meter shaft and displaced therewith, and providing a signal corresponding to the displacement;
    means for providing a command signal;
    means for combining the displacement and command signals and for providing a combined signal;
    means connected to the combining means and responsive to the combined signal for providing a meter shaft displacement signal;
    means included in the input circuit for connecting the circuit to the meter shaft displacement signal means, the inductive means in said circuit being responsive to the meter shaft displacement signal for displacing the meter shaft;
    the input circuit having means for generating a back EMF;
    means connected to the back EMF means and to the connecting means of the input circuit and responsive to the meter shaft displacement signal and the back EMF for providing a meter shaft displacement rate signal; and
    the combining means combining the rate signal with the displacement and command signals for providing a stabilized combined signal.

2. A meter as described by claim 1, including:
    monitor means connected to the combining means and responsive to the stabilized combined signal therefrom when said signal is at a predetermined level for providing an alarm.

3. A meter as described by claim 1, wherein:
    the means connected to the combining means and responsive to the stabilized combined signal therefrom for providing a meter shaft displacement signal includes a lag-lead circuit.

4. A meter as described by claim 1, wherein the combining means includes:
    means for combining the rate and displacement signal; and
    means for combining the combined rate and displacement signal with the command signal to provide the stabilized combined signal.

* * * * *